US011154873B2

(12) United States Patent
Chen (10) Patent No.: US 11,154,873 B2
(45) Date of Patent: Oct. 26, 2021

(54) MULTI-CYCLONIC DUST FILTER DEVICE

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

(*) Notice: Subject to any disclaimer, the term of this patent is extended or adjusted under 35 U.S.C. 154(b) by 104 days.

(21) Appl. No.: 16/576,152

(22) Filed: Sep. 19, 2019

(65) Prior Publication Data

US 2021/0086202 A1 Mar. 25, 2021

(51) Int. Cl.
| | |
|---|---|
| *B01D 45/12* | (2006.01) |
| *B04C 5/103* | (2006.01) |
| *B01D 45/16* | (2006.01) |
| *A47L 9/12* | (2006.01) |
| *A47L 9/16* | (2006.01) |
| *B04C 9/00* | (2006.01) |
| *B01D 46/00* | (2006.01) |

(52) U.S. Cl.
CPC .............. *B04C 5/103* (2013.01); *B01D 45/12* (2013.01); *B01D 45/16* (2013.01); *A47L 9/127* (2013.01); *A47L 9/1666* (2013.01); *A47L 9/1683* (2013.01); *B01D 46/0068* (2013.01); *B04C 2009/002* (2013.01)

(58) Field of Classification Search
CPC ... B04C 5/103; B04C 2009/002; B01D 45/16; B01D 46/0068; B01D 45/12; A47L 9/1666; A47L 9/127; A47L 9/1683
See application file for complete search history.

(56) References Cited

U.S. PATENT DOCUMENTS 2,692,655 A * 10/1954 Peeps .................... B04C 5/12
  55/457
3,169,842 A *  2/1965 Streete .................. B04C 5/14
  55/449

(Continued)

FOREIGN PATENT DOCUMENTS

| CN | 1572220 A | 2/2005 |
|---|---|---|
| CN | 103181741 A | 7/2013 |

(Continued)

*Primary Examiner* — Dung H Bui
(74) *Attorney, Agent, or Firm* — Muncy, Geissler, Olds & Lowe, P.C.

(57) ABSTRACT

A multi-cyclonic dust filter device comprises a dust collection chamber for collecting dust, a cyclonic chamber providing a gas to-be-filtered out dust to enter and forming a first cyclone to enter into the dust collection chamber, and a deflector component disposed between the dust collection chamber and the cyclonic chamber; the deflector component comprises a first deflector tube for receiving the gas to-be-filtered out dust refluxed from the dust collection chamber and forming a second cyclone, and a second deflector tube disposed in a same axial direction as the first deflector tube and separately disposed by an airflow convergence interval, the first deflector tube is provided with at least one dust filter hole for discharging the dust in the second cyclone, and the second deflector tube combines the first cyclone and the second cyclone through the airflow convergence interval to form a third cyclone for discharging.

13 Claims, 9 Drawing Sheets

(56) References Cited

U.S. PATENT DOCUMENTS

| | | | | |
|---|---|---|---|---|
| 5,224,976 A * | 7/1993 | Oranje | B04C 5/103 | 55/399 |
| 9,468,348 B2 | 10/2016 | Chen | | |
| 2003/0200736 A1* | 10/2003 | Ni | B04C 5/181 | 55/426 |
| 2005/0016138 A1* | 1/2005 | Sheidler | B04C 3/04 | 55/347 |
| 2005/0172815 A1* | 8/2005 | Betting | B01D 45/16 | 96/389 |
| 2007/0095028 A1* | 5/2007 | Kim | A47L 9/1641 | 55/337 |
| 2008/0028940 A1* | 2/2008 | Han | B04C 9/00 | 96/417 |
| 2009/0031680 A1* | 2/2009 | Hyun | B01D 45/16 | 55/345 |
| 2010/0043365 A1* | 2/2010 | Fujiyama | B01D 45/12 | 55/426 |
| 2010/0275561 A1* | 11/2010 | Lundquist | B04C 3/06 | 55/456 |
| 2012/0285322 A1* | 11/2012 | Halpap | B04C 5/04 | 95/271 |
| 2014/0033921 A1* | 2/2014 | Peck | B01D 45/08 | 95/269 |
| 2014/0102300 A1* | 4/2014 | Ray, Jr. | F01N 1/08 | 95/272 |
| 2015/0128544 A1* | 5/2015 | Roston | B01D 45/14 | 55/471 |
| 2015/0174508 A1* | 6/2015 | Bozic | B01D 46/2411 | 210/188 |
| 2015/0265112 A1* | 9/2015 | Chen | A47L 9/1691 | 15/347 |
| 2017/0202418 A1 | 7/2017 | Cheo et al. | | |
| 2017/0266596 A1* | 9/2017 | Huntley | A47L 9/1683 | |
| 2018/0036746 A1 | 2/2018 | Antomon et al. | | |
| 2018/0229586 A1* | 8/2018 | Army | B60H 3/0658 | |
| 2018/0272264 A1* | 9/2018 | Ming | B01D 47/025 | |
| 2018/0353888 A1* | 12/2018 | Nie | B04C 3/06 | |
| 2019/0275452 A1* | 9/2019 | Cheng | B01D 45/06 | |
| 2019/0277227 A1* | 9/2019 | Larson | B01D 46/48 | |
| 2019/0321834 A1* | 10/2019 | Chen | B04C 5/04 | |
| 2020/0122199 A1* | 4/2020 | Araos Almendras | B04C 5/081 | |
| 2020/0164296 A1* | 5/2020 | Cho | C23C 16/4412 | |
| 2020/0179850 A1* | 6/2020 | Barger | B01D 45/16 | |
| 2020/0376501 A1* | 12/2020 | Herman | F16K 15/026 | |

FOREIGN PATENT DOCUMENTS

| | | |
|---|---|---|
| JP | 2000254551 A | 9/2000 |
| JP | 2005103251 A | 4/2005 |
| JP | 2005224602 A | 8/2005 |
| JP | 2006205162 A | 8/2006 |
| JP | 2006272322 A | 10/2006 |
| JP | 2006297057 A | 11/2006 |
| JP | 2006346669 A | 12/2006 |
| JP | 2014083478 A | 5/2014 |
| JP | 2015131264 A | 7/2015 |
| TW | 201340929 A | 10/2013 |
| TW | I411422 B | 10/2013 |
| TW | I558462 B | 11/2016 |

* cited by examiner

MULTI-CYCLONIC DUST FILTER DEVICE

FIELD OF THE INVENTION

The present invention relates to a dust filter device for separating dust by cyclone, and more particularly to a multi-cyclonic dust filter device.

BACKGROUND OF THE INVENTION

Figure 1:
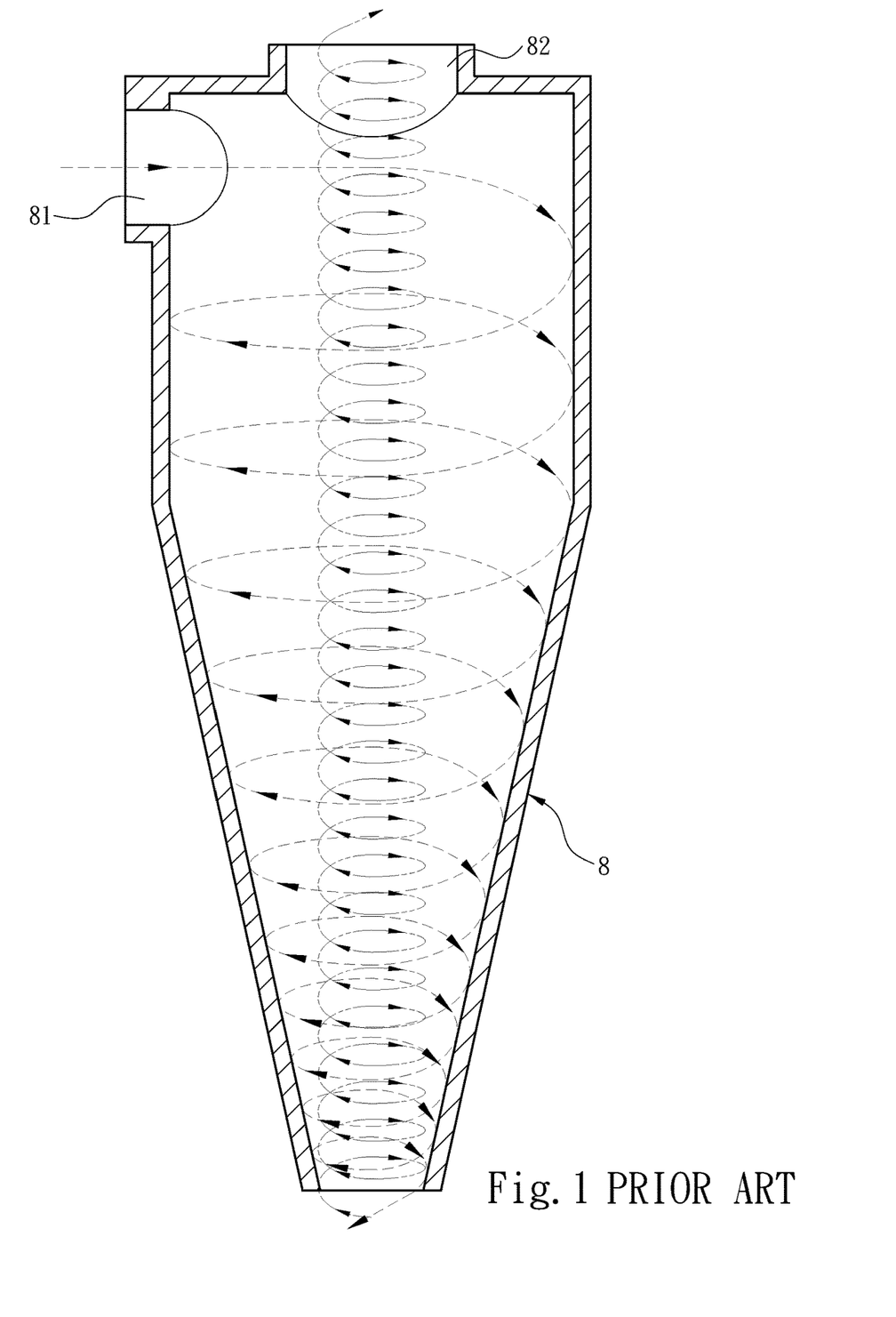
FIG. 1 is a schematic diagram of the implementation of a conventional cyclone separator.
Figure 2:
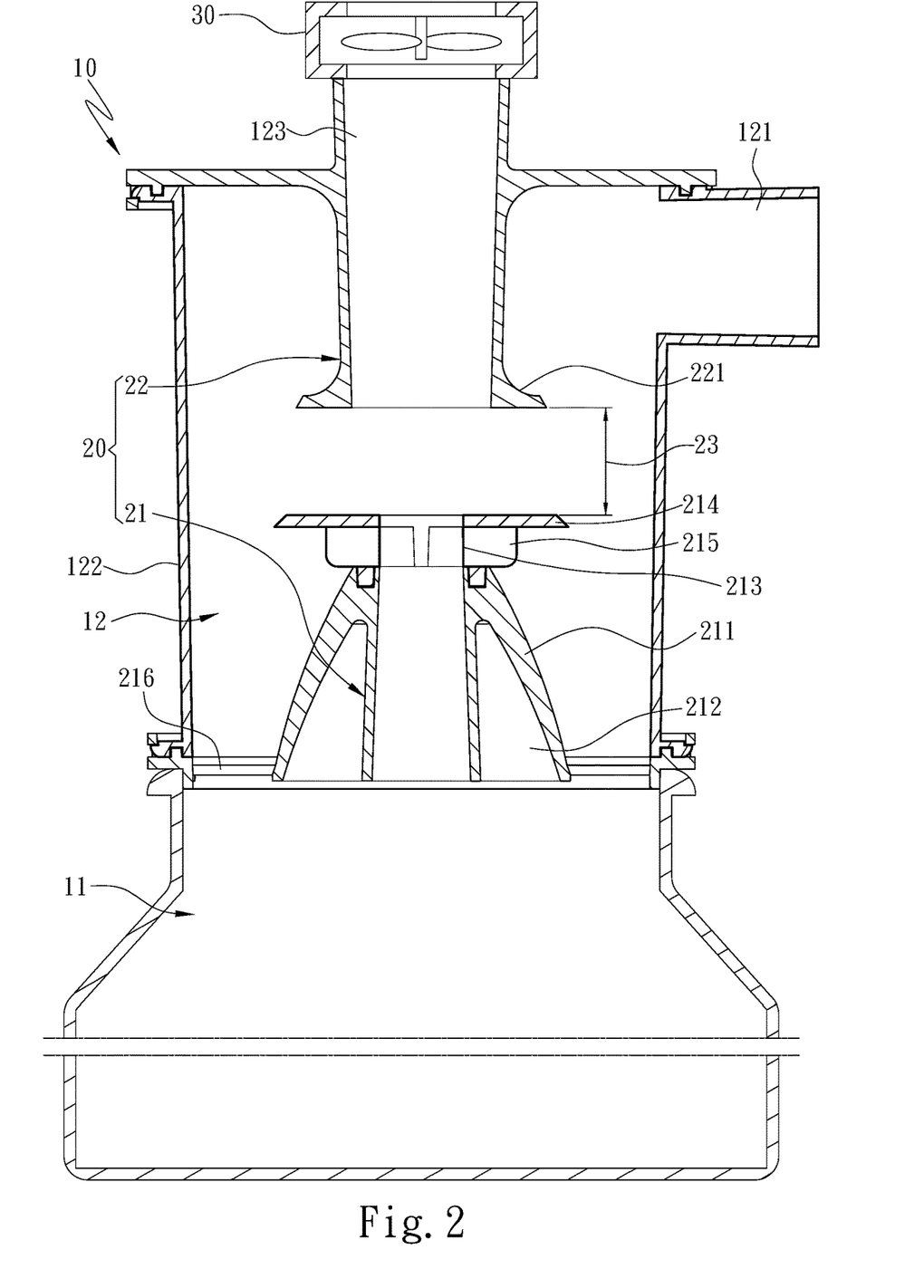
FIG. 2 is a schematic diagram of the structure of a multi-cyclonic dust filter device according to an embodiment of the present invention.
Figure 3:
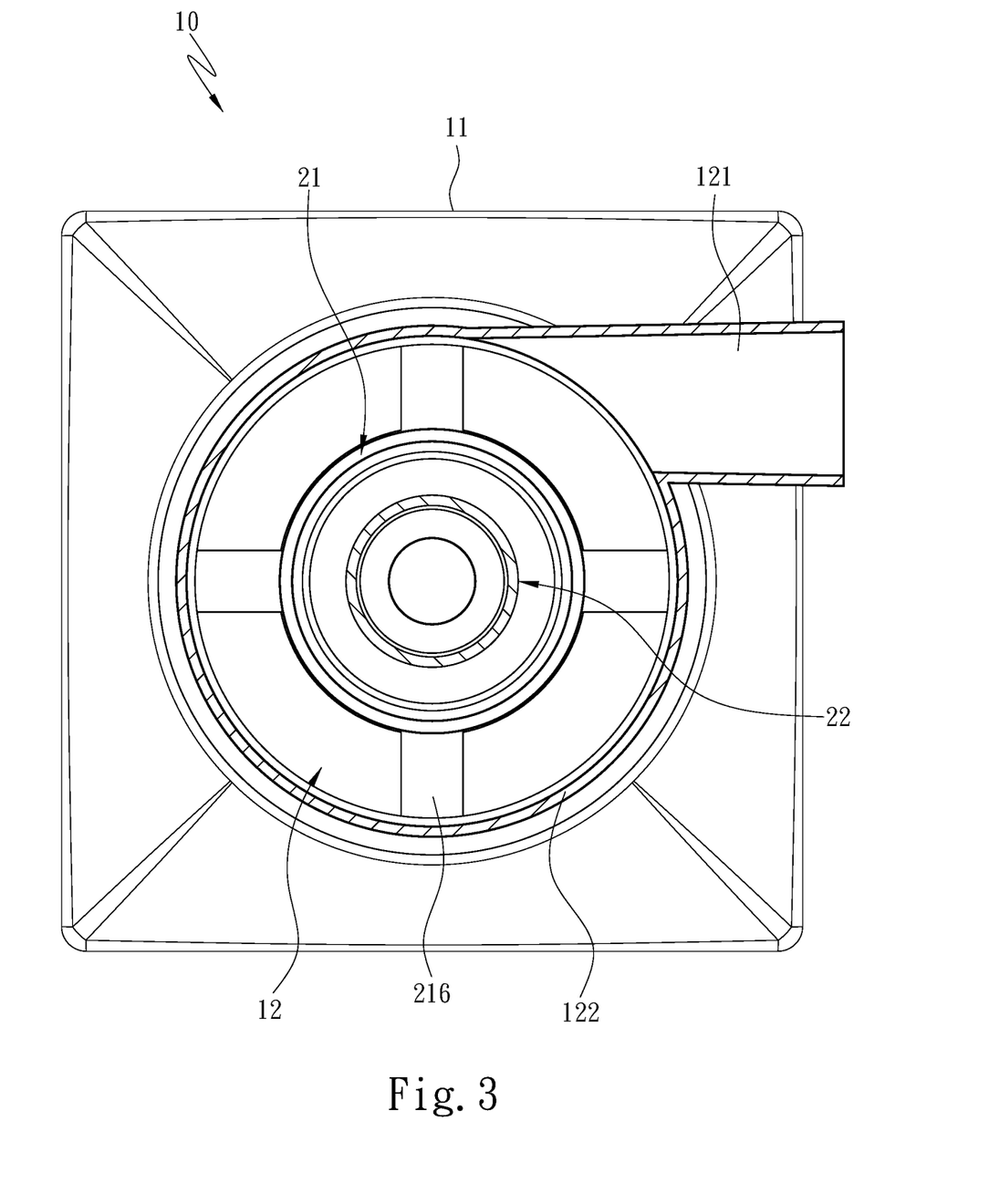
FIG. 3 is a top view of the structure of the multi-cyclonic dust filter device according to an embodiment of the present invention.

The cyclone separation actually belongs to a type of centrifugal sedimentation. The centrifugal force is used to rotate the particles in a vortex flow at a high speed. The faster the rotation speed, the faster the centrifugal sedimentation speed the particles obtain, thereby achieving the object of separating the particles from the airflow. The conventional cyclone separator is shown in FIG. 1, which is mainly composed of a separation cylinder 8, the separation cylinder 8 is disposed with an air inlet 81 at a wall surface thereof, a diameter of a bottom of the separation cylinder 8 is tapered, and a top of the separation cylinder 8 is disposed with an air suction duct 82. In practice, a gas containing dust particles enters through the air inlet 81, the gas then forms a descending swirl along an inner wall of the separation cylinder 8, and finally due to a suction force provided to the suction duct 82, an ascending airflow is formed in the separation cylinder 8. The dust is unable to rise with the ascending airflow due to its own gravity, and sinks to the bottom of the separation cylinder 8, thereby generating a dust collecting effect, and the related patent technique is disclosed in TW I558462.

The dust filter effect of the conventional cyclone separator is quite limited. If the dust filter effect of the cyclone separator is to be increased, there are two main ways to implement, one is to increase the volume of the chamber in the separation cylinder, and the other is to provide a multi-layered dust filter inner cylinder in the separation cylinder, such as TW I411422, TW 201340929, CN 103181741, CN 1572220A, JP 2000-254551A, JP 2005-103251A, JP 2005-224602A, JP 2006-205162A, JP 2006-272322A, JP 2006-297057A, JP 2006-346669A, JP 2014-83478A, JP 2015-131264, US 2017/0202418, US 2018/0036746. However, if the volume of the chamber in the separation cylinder is to be increased, it is undoubtedly that the overall volume of the cyclone separator tends to be bulky. If the multi-layered dust filter inner cylinder is implemented, it will cause the structure of the cyclone separator to become more complicated, in addition to being unfavorable for maintenance, the periodic replacement of the dust filter inner cylinder is a major problem. For example, if it is implemented in an environment in which dangerous gases are to be filtered, in case the dust filter inner cylinder needs to be replaced, the entire system must be turned off or even shut down for a period of time before it can be replaced. Although cyclone separation technology has been successfully applied to household dust suction devices in recent years, household dust suction devices only need to collect a small amount of dust particles, and the requirements for dust filter effect are low compared with industrial requirements. If the same simple structure of the cyclone separator with small volume is applied to the industrial implementation, its dust filter effect obviously does not meet the requirements of the industrial application.

In addition, the applicant of the present invention has also proposed similar patented technologies, such as U.S. Ser. No. 15/960,121, U.S. Pat. No. 9,468,348.

SUMMARY OF THE INVENTION

A main object of the present invention is to improve the dust filter efficiency of the dust collection implemented by the multi-cyclonic dust filter device and to simplify the dust filter device.

In order to achieve the above object, the present invention provides a multi-cyclonic dust filter device, comprising a dust collection chamber which is capable of collecting dust, a cyclonic chamber which is capable of providing a gas to-be-filtered out dust to enter and forming a first cyclone to enter into the dust collection chamber, and a deflector component disposed between the dust collection chamber and the cyclonic chamber; the deflector component comprises a first deflector tube which is capable of receiving the gas to-be-filtered out dust refluxed from the dust collection chamber and forming a second cyclone, and a second deflector tube disposed in a same axial direction as the first deflector tube and spaced apart from the first deflector tube by an airflow convergence interval, the first deflector tube is provided with at least one dust filter hole for discharging the dust in the second cyclone, and the second deflector tube combines the first cyclone and the second cyclone through the airflow convergence interval to form a third cyclone for discharging.

In one embodiment, the dust filter hole is disposed at one end portion of the first deflector tube located at the airflow convergence interval, and the end portion is extendedly disposed with a first retaining wall and a third retaining wall to assist the dust in entering the first cyclone and then flow back into the dust collection chamber.

In one embodiment, relative end portions of the first deflector tube and the second deflector tube located at the airflow convergence interval are extended with a first retaining wall and a second retaining wall respectively, and an outer periphery of the first retaining wall is larger than an outer periphery of the second retaining wall.

In one embodiment, the third retaining wall is further extendedly disposed with a deflector hood toward the dust collection chamber to assist the dust in falling into the dust collection chamber, and a spacing is formed between the deflector hood and the first deflector tube.

In one embodiment, an inner diameter of the second deflector tube is larger than an inner diameter of the first deflector tube.

In one embodiment, the inner diameter of the first deflector tube is tapered from one end located at the dust collection chamber toward the other end of the first deflector tube located at the airflow convergence interval.

In one embodiment, the inner diameter of the second deflector tube is gradually increased from one end located at the airflow convergence interval toward the other end of the second deflector tube located at an exhaust port.

In one embodiment, the first deflector tube is connected between the dust collection chamber and the cyclonic chamber by a plurality of brackets.

DETAILED DESCRIPTION OF THE PREFERRED EMBODIMENTS

The detailed description and technical content of the present invention will now be described with reference to the accompanying drawings as follows.

In the following content, the expressions of "first" and "second" used in the elements are intended to distinguish the elements and are not intended to limit the order of the elements. In addition, the following spatial relative expressions such as "top end", "bottom edge", "upward" and "downward" are based on the directions in which the figures are drawn. It is understandable that these spatial relative expressions can be changed as changes are made to the directions in which the figures are drawn, for example, once the figures are drawn horizontally, the original "top end" and "bottom edge" will be changed to "left" and "right" respectively.

Please refer to FIGS. 2, 3, 4A, 4B and 4C, the present invention provides a multi-cyclonic dust filter device 10, the dust filter device 10 can be applied to an industrial process requiring clean working gas. The dust filter device 10 comprises a dust collection chamber 11 for collecting dust 40 in a gas to-be-filtered out dust, a cyclonic chamber 12 communicating with the dust collection chamber 11, and a deflector component 20 disposed in the cyclonic chamber 12. Wherein, the cyclonic chamber 12 comprises a first spatial width, and the dust collection chamber 11 comprises a second spatial width which is greater than the first spatial width. Furthermore, the cyclonic chamber 12 communicates with the dust collection chamber 11 to allow gas to flow between the cyclonic chamber 12 and the dust collection chamber 11.

The cyclonic chamber 12 comprises an air inlet 121, an annular side wall 122 connecting the air inlet 121, and an exhaust port 123. In one embodiment, the air inlet 121 can be a tubular structure protruding from the annular side wall 122. Further, the air inlet 121 is disposed at an end of the cyclonic chamber 12 opposing to the dust collection chamber 11, and the exhaust port 123 is disposed at a top end of the cyclonic chamber 12.

The deflector component 20 is disposed in the cyclonic chamber 12. The deflector component 20 comprises a first deflector tube 21 which is capable of receiving the gas to-be-filtered out dust refluxed from the dust collection chamber 11 and guiding the gas to-be-filtered out dust to flow spirally to form a second cyclone 60, and a second deflector tube 22 located in a same axial direction as the first deflector tube 21 and spaced apart from the first deflector tube 21 by an airflow convergence interval 23. The first deflector tube 21 is disposed in the cyclonic chamber 12 and connected to a plurality of brackets 216. The second deflector tube 22 is connected to the exhaust port 123. The airflow convergence interval 23 is a predetermined interval, and a relative distance of the airflow convergence interval 23 is correspondingly changed according to cyclone speeds, inner diameters of the deflector tubes, and sizes of the chambers.

Figure 4A:
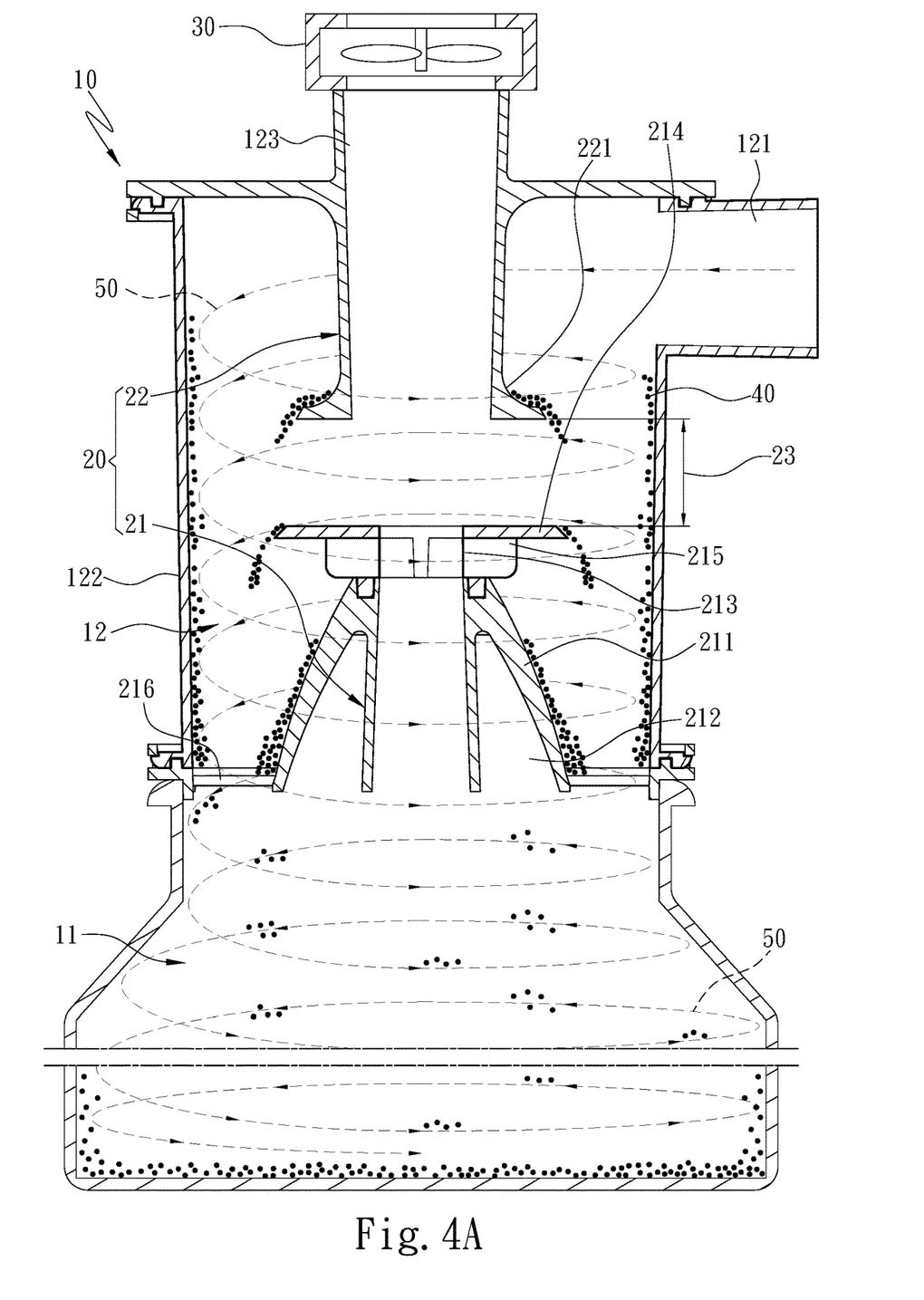
FIG. 4A is a schematic diagram of the implementation of a first cyclone according to an embodiment of the present invention.
Figure 4B:
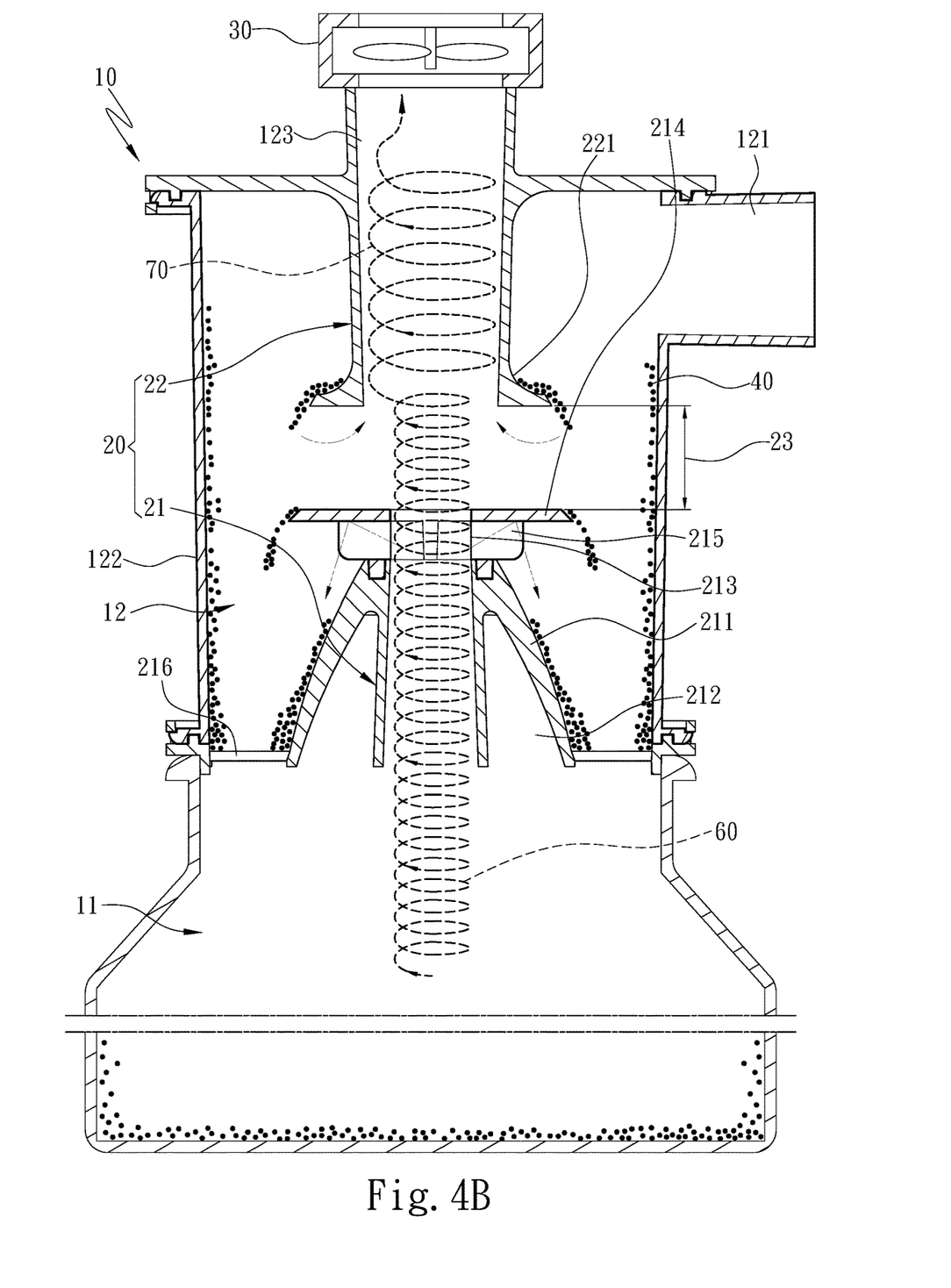
FIG. 4B is a schematic diagram of the implementation of a second cyclone and a third cyclone according to an embodiment of the present invention.
Figure 4C:
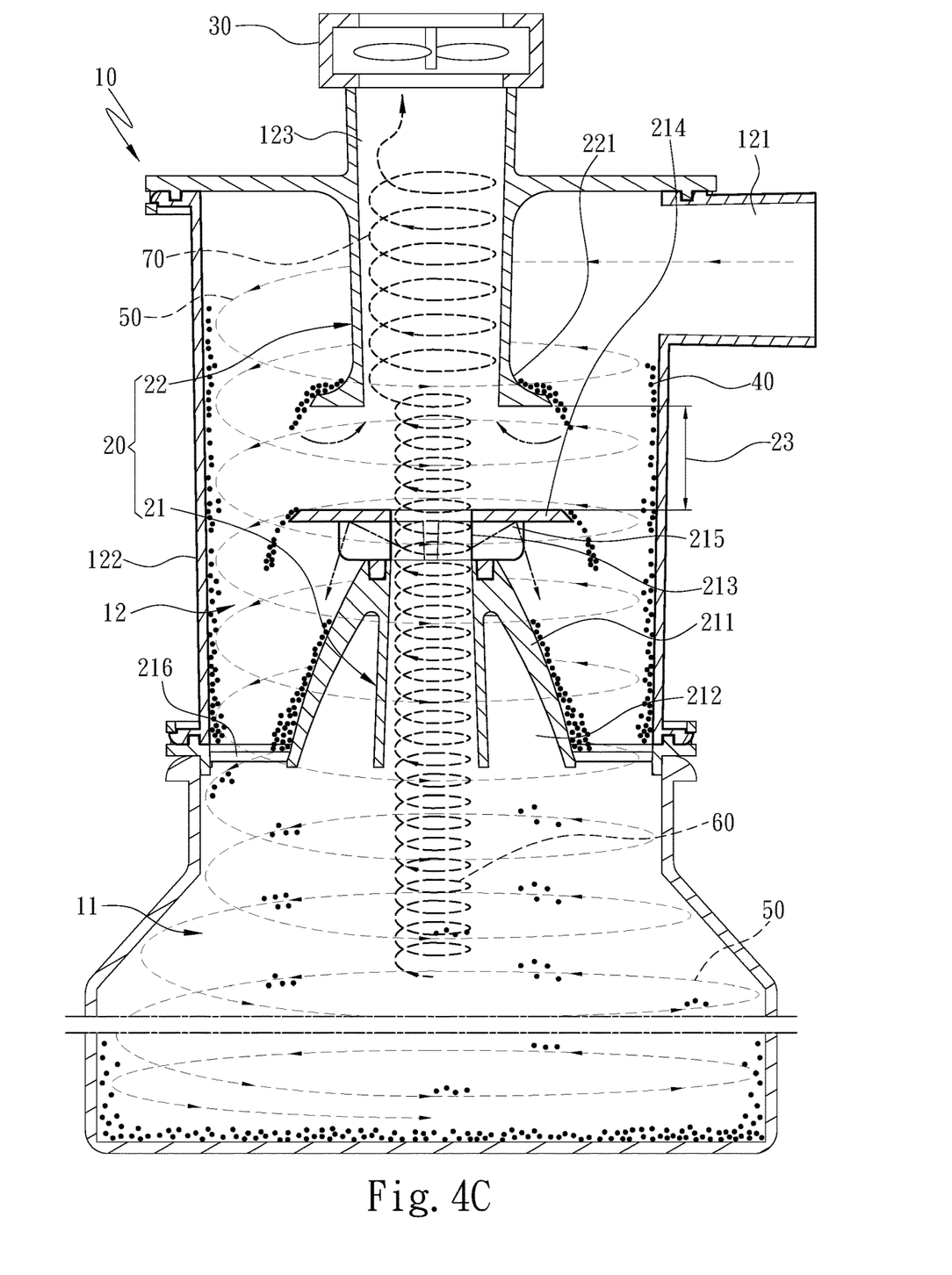
FIG. 4C is a schematic diagram of the implementation of combination of cyclones according to an embodiment of the present invention.
Figure 5:
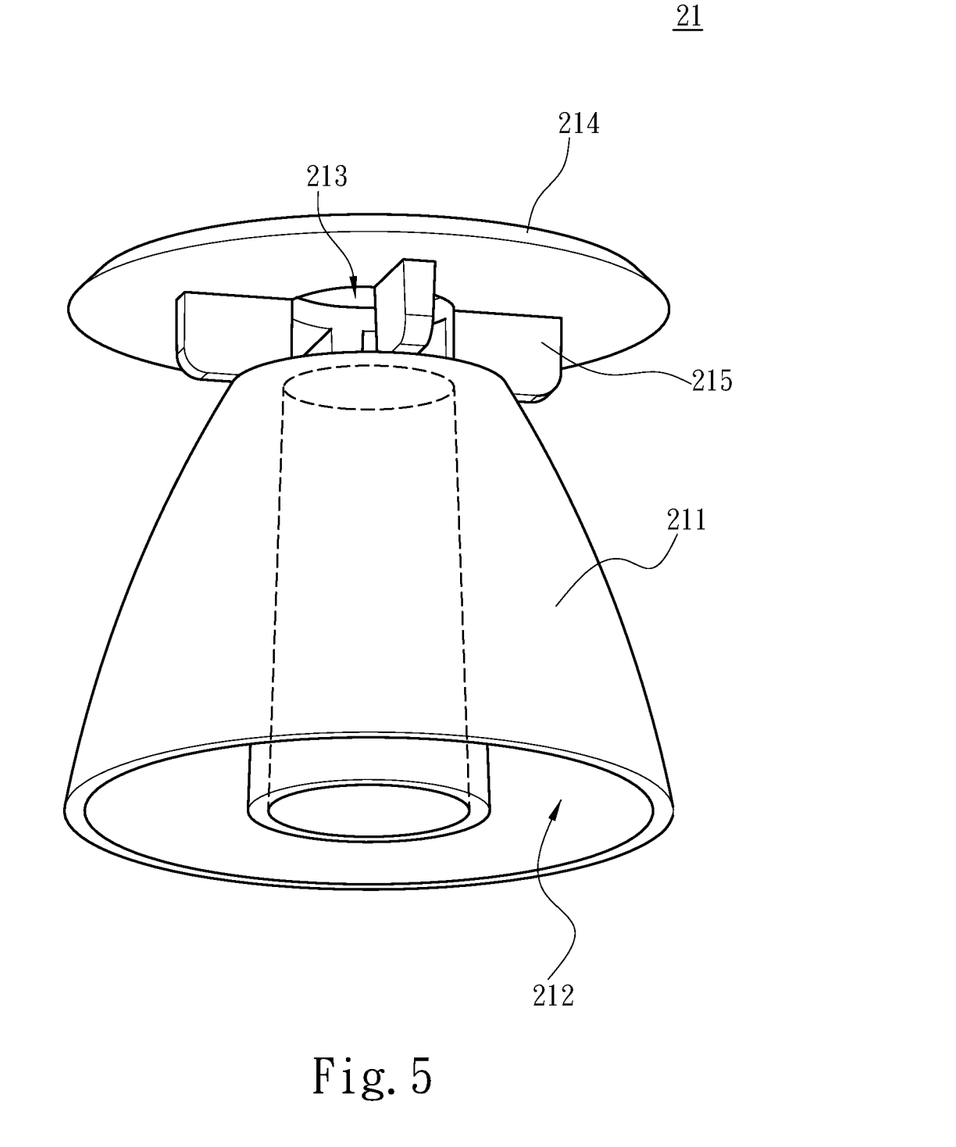
FIG. 5 is a perspective view of the structure of a first deflector tube according to an embodiment of the present invention.

Please refer to FIGS. 4C and 5 at the same time. The first deflector tube 21 is provided with at least one dust filter hole 213 which is capable of discharging the dust 40 in the second cyclone 60. The preferred embodiment is that the dust filter hole 213 is disposed at an end portion of the first deflector tube 21 located at the airflow convergence interval 23, the end portion is extendedly disposed with a first retaining wall 214 toward the side wall 122, and a position of the first retaining wall 214 corresponding to the dust filter hole 213 is extendedly disposed with a third retaining wall 215 toward the dust collection chamber 11. The first retaining wall 214 and the third retaining wall 215 allow collision to be occurred when the dust 40 in the second cyclone 60 is centrifugally flung from the dust filter hole 213, so that the dust 40 is allowed to be merged into a first cyclone 50 and then flowed back to the dust collection chamber 11 for re-filtering. Alternatively, the third retaining wall 215 is extendedly disposed with a deflector hood 211 toward the dust collection chamber 11 to assist the dust 40 in directly falling into the dust collection chamber 11. An inner diameter of the deflector hood 211 is larger than a tube diameter of the first deflector tube 21, and a spacing 212 is formed between the deflector hood 211 and the first deflector tube 21. An outer wall surface of the deflector hood 211 is a guiding arc surface which is effectively assisting the dust 40 in falling directly into the dust collection chamber 11 to avoid re-merging into the second cyclone 60.

Please refer to FIGS. 4A, 4B and 4C at the same time. When an external air extractor 30 is started, the gas to-be-filtered out dust enters from the air inlet 121 to form the first cyclone 50 in the cyclonic chamber 12, and the first cyclone 50 settles downwardly toward the dust collection chamber 11, the dust 40 in the gas to-be-filtered out dust then close to the side wall 122 of the dust collection chamber 11 due to the centrifugal force of the cyclone, and the dust 40 in the gas to-be-filtered out dust is settled and deposited toward the dust collection chamber 11 due to the gravity of the dust 40. When the second cyclone 60 is formed, an airflow is also formed in the dust collection chamber 11 to bring out a part of the dust 40. At this time, when the second cyclone 60 moves to the position of the dust filter hole 213, part of the dust 40 will be flung from the dust filter hole 213 to outside of the first deflector tube 21 due to the centrifugal force of the cyclone. In order to prevent the first cyclone 50 and the second cyclone 60 from interfering with each other, and merging the dust 40 into the first cyclone 50 effectively and then flowing back to the dust collection chamber 11, or allowing the dust 40 to directly descend along the deflector hood 211 to the dust collection chamber 11 due to the gravity of the dust 40, as shown in FIG. 4D, the dust 40 is collided to change the traveling direction to achieve the above object of re-filtering through the first retaining wall 214 and the third retaining wall 215.

Figure 4D:
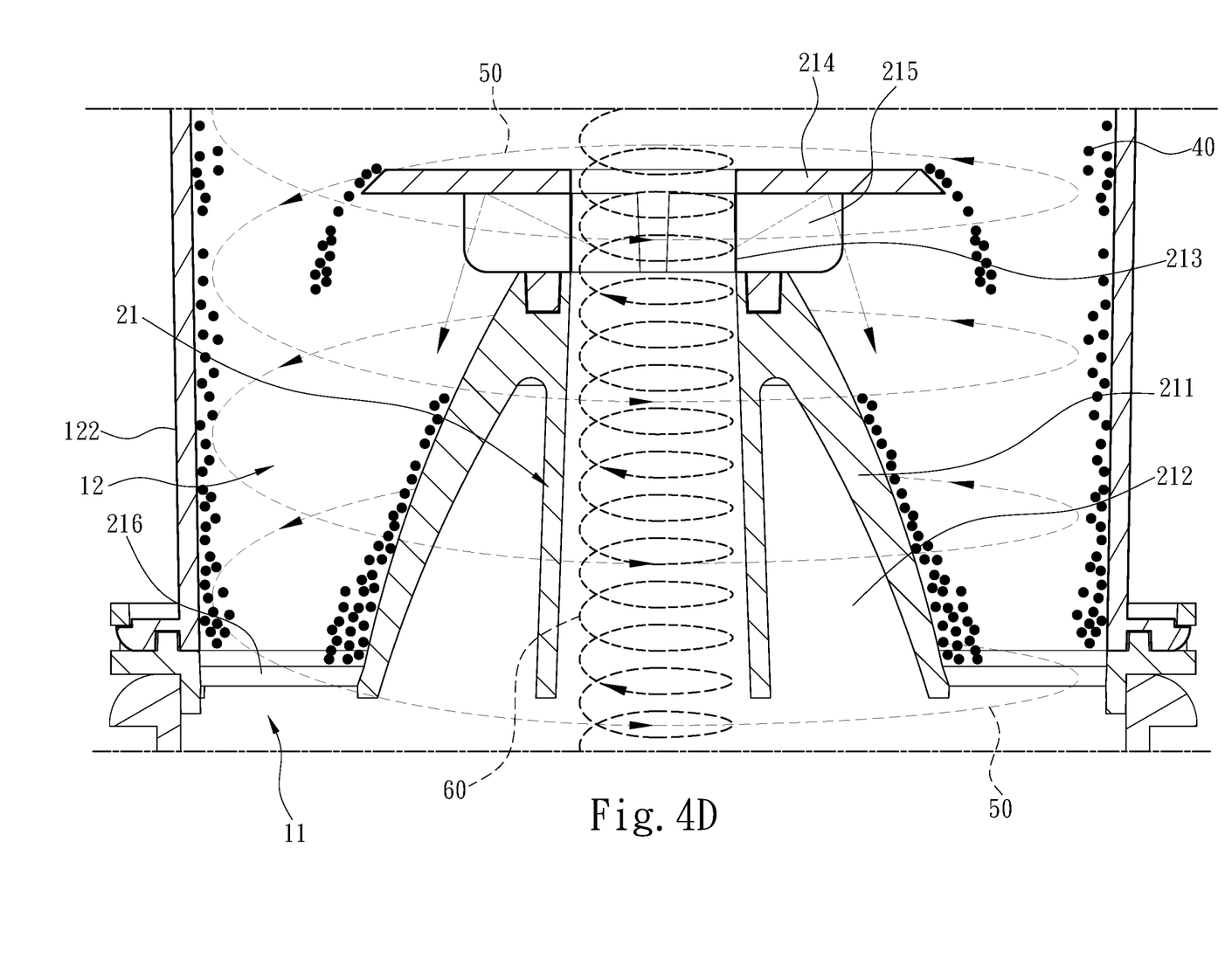
FIG. 4D is an enlarged schematic diagram of the implementation of the first cyclone and the second cyclone according to an embodiment of the present invention.
Figure 4E:
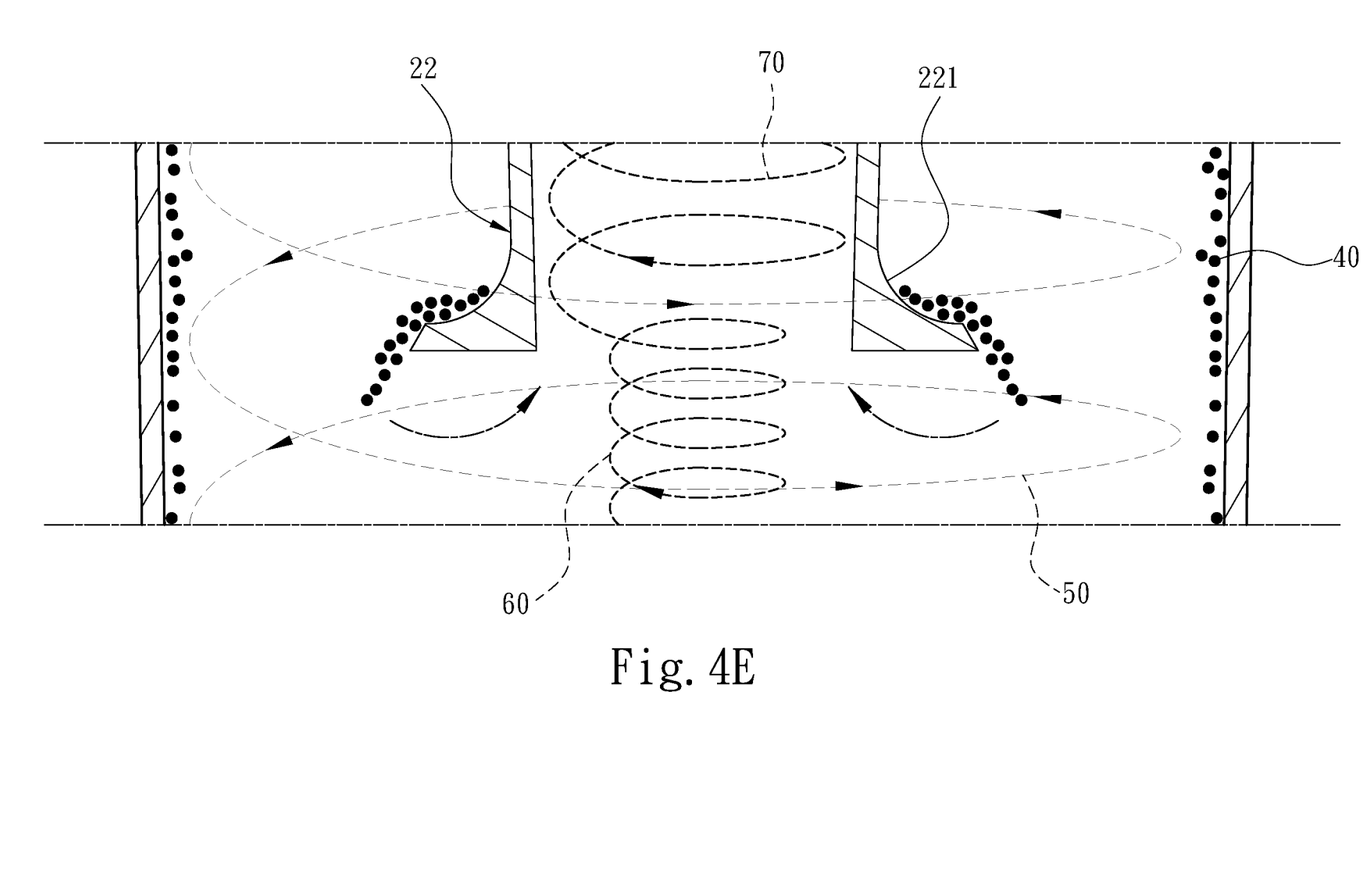
FIG. 4E is an enlarged schematic diagram of the implementation of combination of cyclones according to an embodiment of the present invention.

Please refer to FIGS. 4C, 4D and 4E, a third cyclone 70 is defined by the clean gas which is entering the second deflector tube 22 and discharging to the outside through the external air extractor 30. The third cyclone 70 is formed by the first cyclone 50 and the second cyclone 60, and the third cyclone 70 enters the second deflector tube 22 from the airflow convergence interval 23. Wherein, after the second cyclone 60 is re-filtered through the design of the dust filter hole 213 of the first deflector tube 21, the second cyclone 60 is already a clean gas when leaving the first deflector tube 21, and the dust 40 in the first cyclone 50 is gathered in the annular side wall 122 due to the centrifugal force of the cyclone. Relatively speaking, the gas at a central position of the first cyclone 50 is also a clean gas, and therefore, the third cyclone 70 is combined by the first cyclone 50 and the second cyclone 60 to enter into the second deflector tube 22, wherein the third cyclone 70 has been filtered out dust as a clean gas. In order to improve the dust filter effect of the present invention, please refer to FIG. 4C, an inner diameter of the second deflector tube 22 is designed to be larger than an inner diameter of the first deflector tube 21, the inner diameter of the first deflector tube 21 is tapered from one end located at the dust collection chamber 11 toward the other end of the first deflector tube 21 located at the airflow convergence interval 23, and the inner diameter of the second deflector tube 22 is gradually increased from one end located at the airflow convergence interval 23 toward the other end of the second deflector tube 22 located at the exhaust port 123, thereby determining the airflow rate and density of the second cyclone 60 and the third cyclone 70 to ensure that only the clean gas merges into the third cyclone 70. In addition, in order to reduce the possibility of a trace of the dust 40 that present in the airflow at a central area of the first cyclone 50 and being mixed into the third cyclone 70, an end portion of the second deflector tube 22 located at the airflow convergence interval 23 is extended with a second retaining wall 221 toward the annular side wall 122, so the dust 40 settled that is blocked by the second retaining wall 221 and only allowed the clean gas to be merged into the third cyclone 70. An outer periphery of the first retaining wall 214 is larger than an outer periphery of the second retaining wall 221, the outer periphery of the first retaining wall 214 and the outer periphery of the second retaining wall 221 respectively form a guiding surface, and the guiding surfaces effectively assist the dust 40 in falling toward the dust collection chamber 11.

What is claimed is:

1. A multi-cyclonic dust filter device, comprising:
a dust collection chamber configured to collect dust in a gas to-be-filtered out dust;
a cyclonic chamber communicating with the dust collection chamber, the cyclonic chamber comprising an air inlet provided for the gas to-be-filtered out dust to enter, a side wall connected to the air inlet to guide the gas to-be-filtered out dust to spirally flow toward the dust collection chamber to form a first cyclone, and an exhaust port; and
a deflector component disposed in the cyclonic chamber, the deflector component comprising a first deflector tube configured to receives the gas to-be-filtered out dust refluxed from the dust collection chamber and guides the gas to-be-filtered out dust to flow spirally to form a second cyclone, and a second deflector tube located in a same axial direction as the first deflector tube and spaced apart from the first deflector tube by an airflow convergence interval, the first deflector tube being provided with at least one dust filter hole for discharging the dust in the second cyclone, the least one dust filter hole directly faces the side wall of the cyclonic chamber, and the second deflector tube combining the first cyclone and the second cyclone through the airflow convergence interval to form a third cyclone for discharging toward the exhaust port.

2. The multi-cyclonic dust filter device as claimed in claim 1, wherein the dust filter hole is disposed at an end portion of the first deflector tube located at the airflow convergence interval.

3. The multi-cyclonic dust filter device as claimed in claim 2, wherein the end portion is extendedly disposed with a first retaining wall toward the side wall.

4. The multi-cyclonic dust filter device as claimed in claim 3, wherein a position of the first retaining wall corresponding to the dust filter hole is extendedly disposed with a third retaining wall toward the dust collection chamber.

5. The multi-cyclonic dust filter device as claimed in claim 4, wherein the third retaining wall is extendedly disposed with a deflector hood toward the dust collection chamber to assist the dust in falling into the dust collection chamber.

6. The multi-cyclonic dust filter device as claimed in claim 1, wherein an end portion of the second deflector tube located at the airflow convergence interval is extended with a second retaining wall toward the side wall.

7. The multi-cyclonic dust filter device as claimed in claim 6, wherein an end portion of the first deflector tube located at the airflow convergence interval is extended with a first retaining wall toward the side wall.

8. The multi-cyclonic dust filter device as claimed in claim 7, wherein an outer periphery of the first retaining wall is greater than an outer periphery of the second retaining wall.

9. The multi-cyclonic dust filter device as claimed in claim 8, wherein the outer periphery of the first retaining wall and the outer periphery of the second retaining wall respectively form a guiding surface to assist the dust in falling toward the dust collection chamber.

10. The multi-cyclonic dust filter device as claimed in claim 1, wherein an inner diameter of the second deflector tube is greater than an inner diameter of the first deflector tube.

11. The multi-cyclonic dust filter device as claimed in claim 1, wherein an inner diameter of the first deflector tube is tapered from one end located at the dust collection chamber toward an other end of the first deflector tube located at the airflow convergence interval.

12. The multi-cyclonic dust filter device as claimed in claim 11, wherein an inner diameter of the second deflector tube is gradually increased from one end located at the airflow convergence interval toward an other end of the second deflector tube located at the exhaust port.

13. The multi-cyclonic dust filter device as claimed in claim 1, wherein the first deflector tube is connected in the cyclonic chamber by a plurality of brackets.

* * * * *